United States Patent [19]

Catterfeld

[11] 4,179,239

[45] Dec. 18, 1979

[54] MODULAR PUMP UNIT FOR MULTISTAGE HIGH PRESSURE SLURRY PUMP

[75] Inventor: Fritz C. Catterfeld, Canoga Park, Calif.

[73] Assignee: Rockwell International Corporation, El Segundo, Calif.

[21] Appl. No.: 918,230

[22] Filed: Jun. 23, 1978

[51] Int. Cl.² .................. F04D 29/04; F16D 1/02
[52] U.S. Cl. .................. 415/198.1; 415/213 R; 403/337
[58] Field of Search ............ 415/198.1, 199.1, 199.2, 415/199.3, 199.6, 213 R; 417/359, 360; 403/336, 337, 338

[56] References Cited

U.S. PATENT DOCUMENTS

| | | | |
|---|---|---|---|
| 1,820,344 | 8/1931 | Caldwell | 415/199.1 |
| 2,166,436 | 7/1939 | Harlow | 415/198.1 |
| 2,482,229 | 9/1949 | Weaver | 415/199.1 X |
| 3,334,495 | 8/1967 | Jensen et al. | 403/337 X |
| 3,799,691 | 3/1974 | Martin | 415/199.1 |
| 4,037,980 | 7/1977 | Haentjens | 403/336 |

FOREIGN PATENT DOCUMENTS 2361311 6/1974 Fed. Rep. of Germany ........... 403/336

Primary Examiner—Leonard E. Smith
Attorney, Agent, or Firm—L. Lee Humphries; Robert M. Sperry

[57] ABSTRACT

This application discloses a modular pump unit that can be stacked in line with any number of similar units, limited only by the total capacity of the drive shaft. The single modular units are without shaft bearings, they are attached to each other with an axial adjustment self-centering coupling. The shaft bearing units are separate and mounted to a pump unit on each end of the modular bank.

11 Claims, 4 Drawing Figures

MODULAR PUMP UNIT FOR MULTISTAGE HIGH PRESSURE SLURRY PUMP

BACKGROUND OF THE INVENTION

1. Field of the Invention

This invention relates to slurry pumps.

More particularly, this invention relates to modular centrifugal coal slurry pumps which may be stacked in series, limited only by the torque capacity of the pump drive unit.

2. Description of the Prior Art

Multiple pumps on a common shaft are well known in the prior art. For example, U.S. Pat. No. 1,020,161 describes a multiplicity of ganged pumps which are driven by a single, solid shaft extending through all of the individual pumps supported by bearing stands. The stackup of pumps are driven by an electric motor positioned at one end of the line of pumps. The foregoing pump arrangement is disadvantaged in that no single pump can be replaced without disassembly of the entire multiple-pump stackup.

U.S. Pat. No. Re. 28,540 describes a composite knockdown pump wherein the multiple pump assembly is essentially a multistage pump consisting of a plurality of pumps mounted to a common base and driven by a common shaft similar to the foregoing patent. Individual pump stages cannot be replaced without the disassembly of the multiple unit and the removal of the common shaft.

With an increase in the use of coal to fulfill our energy needs, the need to transport the coal is increasingly important. Therefore, pipelines carrying slurries of coal particles will be used extensively. Since coal slurry particles carried in a stream of liquid are abrasive, various pumping stations along the pipeline will require constant maintenance. By utilizing pump modules that may be easily coupled together for replacement purposes instead of a multistation pumping unit where failure of any one pump station will shut down the entire pipeline, the instant modular unit may be easily replaced with a minimum shutdown time. None of the foregoing prior art patents describe or teach a means to easily replace or repair a pumping station during operation. This invention goes beyond the prior art in that there is not a single drive shaft that goes through all of the pumping units—rather each modular pump may be disengaged from the stackup of modular units without removal of a single drive shaft. A self-centering coupling device associated with each of the modular pump units allows for self-alignment without a great deal of skill by the installer.

Therefore, an advantage over the prior art is the ability to remove one or more of the modular pump units from a drive line without removing a solitary drive line that drives all of the pumps.

Still another advantage over the prior art is the self-aligning centering feature of the coupling unit between the modular pump units.

Thus, it is an object of this invention to provide multiple modular pumping units that may be removed from a drive line without disturbing any of the other modular units within the pump stackup.

More specifically, it is an object of this invention to provide a modular unit which is a high-temperature centrifugal coal slurry pump with a self-centering coupling that may be easily installed or removed from a stackup of multiple modular pumping units without disturbing any of the other modular pumping units.

SUMMARY OF THE INVENTION

A multiple pump assembly wherein single pump units are serially connected on a common drive shaft and driven by a motor, the improvement comprising a modular pump that forms inlet and outlet means therein, the pump having a first mating coupling flange on an impeller shaft and a second mating coupling flange on a second end on the shaft. A conduit means connects the outlet from one modular pump to the inlet of an adjacent pump. An axially adjustable, forced center drive coupling is connectable to the first and second ends of the impeller shaft, the drive coupling having a circular disc forming an inner concentric opening with a conical surface therein. The disc further forms at least three keys equidistantly spaced and extending radially from the disc, the keys interfit with slots formed in an opposing coupling flange of an adjacent pump, the coupling flange having a short impeller shaft extension with a conical surface formed at its end to conform to the conical surface in the disc. As the disc is moved by mechanical means from one mating flange into an opposing flange, the adjacent pump shafts are forced concentric one with the other, thus aligning one modular pump with an adjacent pump.

The apparatus herein described consists of a high pressure, high temperature, centrifugal coal slurry modular pump unit that may be stacked in line with any number of similar modular pump units limited only by the torque capacity of the drive shaft. The single modular pumps are without shaft bearings, and they are attached to one another with an axial adjustment, self-centering coupling. The shaft bearing units are separate and mounted to a modular bank in the stackup of pumps. The modular system allows for the replacement of a faulty pump to be exchanged with a new standby pump with a minimum of time and effort.

A feature of the modular pump unit is the generous plenum space around the rotating impeller. The design was implemented in order to reduce the relative velocity of the coal slurry between the impeller shroud and the volute walls. By reducing the rotational velocity of the slurry, the wear rate within the pump will be greatly reduced. The open plenum design facilitates additional treatment of the internal pump passages with hardening methods to reduce wear rate, such as boride and tungsten carbide deposit or hard metal inserts may be readily implemented.

The modular pump unit, as heretofore stated, requires a precision high-torque drive coupling with self-centering features and axial adjustment capability. The coupling, upon being tightened, will self-center and, at the same time, adjust for the difference in length between the original modular pump unit and the new pump unit. There will be no difference in the torque transmission capability. The three main functions required of the coupling device, i.e. axial, center and torque, are done with the positioning of a key disc. The center hole of the disc has a cylindrical bore which is ground concentric with a cone that extends for half the length of the bore. The cylindrical section of the disc bore is positioned onto a short shaft section which is concentric with the driven shaft. Three drive keys on the outer periphery of the disc engage in slots machined into the mating coupling flange. The opposing coupling flange has similar slots for the engagement of the drive keys.

As the disc is moved from the mating flange onto the opposing flange, the pump shaft is forced concentric. It now remains to set the proper external shaft-to-housing clearance by spacing the housing relative to the floor mount.

The above-noted objects and advantages of the present invention will be more fully understood upon a study of the following detailed description in conjunction with the detailed drawings.

DESCRIPTION OF THE PREFERRED EMBODIMENTS

Figure 1:
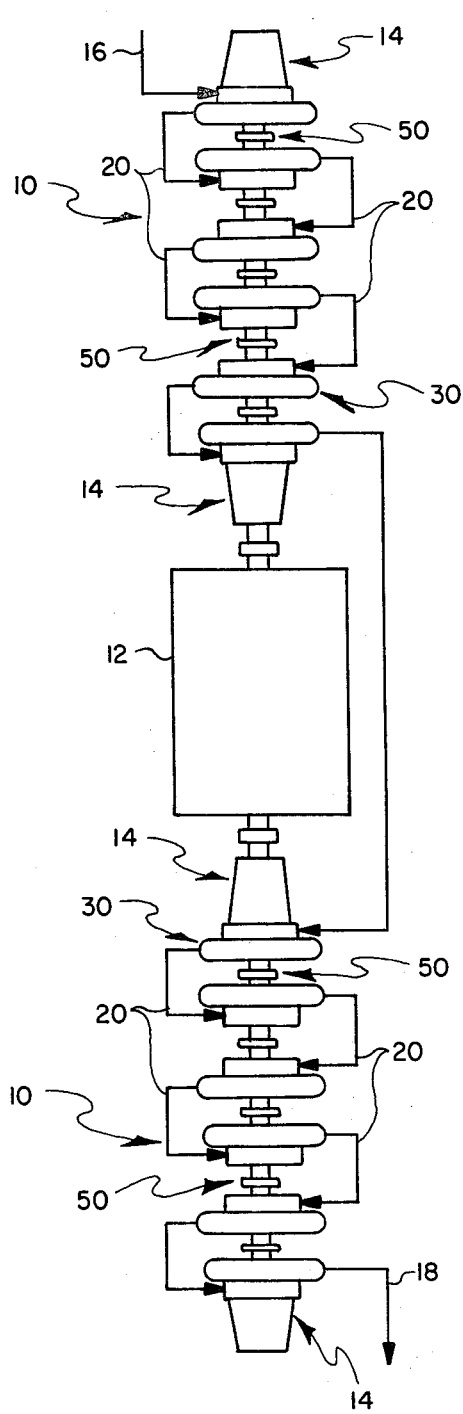
FIG. 1 is a semi-schematic of a multiplicity of modular pump units connected to a prime mover.

Referring to FIG. 1, the multiple centrifugal pump unit generally designated as 10 is comprised of multiple modular pump units generally designated as 30. Each stack or gang of modular pump units 30 are coupled together by a coupling mechanism generally designated as 50. The gang or stack of modular pumps are supported at opposite ends by bearing units 14. Any number of modular pump units may be employed, limited only by the driving capacity of motor 12. As indicated in FIG. 1, a series of modular pump units may be positioned in line in series with the pump driving motor 12 at one end, while the opposite end of the pump motor 12 drives another series of modular pump units. An inlet 16 supplies, for example, coal slurry into the inlet of the first modular pump unit. The outlet of the first pump is fed into the inlet of the next pump downstream in series through conduits 20. The outlet of the second pump is fed into the inlet of the third pump and so on. The coal slurry stream, thus, is accelerated through the gang of modular pumps out through exits 18 into the main coal slurry conduit for transportation to another station. Since there is no common shaft through all of the aligned modular pump units, any one of the pumps in the line may be removed without disrupting any of the other pumps in line. The self-centering axial adjustment coupling assures that the replacement pump is accurately aligned with the adjacent pumps, thus assuring proper operation of the replacement pump. Due to the nature of the self-centering axial adjustment coupling, there are no bearings per se in the individual modular centrifugal pump units. The only bearings for the gang of modular pumps are positioned at opposite ends of the line of modular pumps. The pumping station down time, then, is minimized. Since the pumps are easily replaced, the skill level required for the replacement process is minimized.

Figure 2:
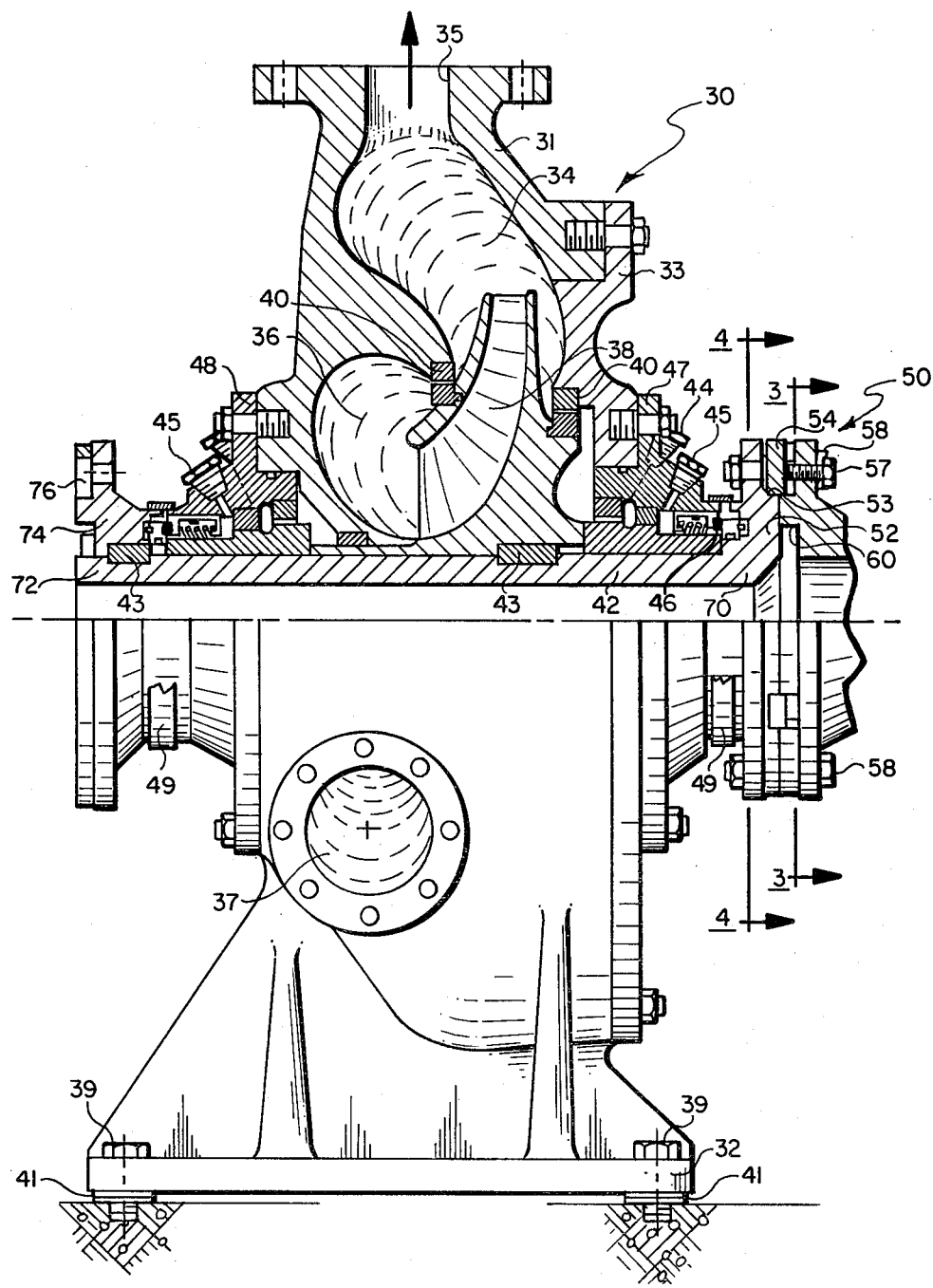
FIG. 2 is a partial cross-section of one of the modular pump units.

Referring now to FIG. 2, the individual centrifugal pump unit generally designated as 30 is comprised of a pump housing 31 which forms a base 32 so that the modular unit may be anchored to a pumping station platform. Housing 31 forms an inlet volute 36 and an exit volute 34 thereby. An impeller 38 is mounted on to a bearingless shaft 42, the impeller being keyed to the shaft through keyway 43. A series of, for example, tungsten carbide seals 40 separate the inlet volute from the exit volute. An impeller access plate 33 is secured to housing 31. A secondary plate 47 is secured to impeller access plate 33 which contains a system to purge the cavity adjacent the face contact seals 46 positioned at opposite ends of the modular pump. Plate 47 includes a dump port 44 which allows any of the slurry material that passes the tungsten carbide seals moving from the high pressure exit volute 34 towards the access plate 33 and out through the port 44. A purge fluid port 45 is utilized to dump "clean" fluid into port 45 under pressure which passes through the seals towards the port that is dumping the contaminated material from the exit volute 34. The purge system prevents abrasive material from entering the cavity containing the sliding face seals at opposite ends of the modular pump unit.

There are no bearings within the individual modular centrifugal pumps. Thus, when the units are not in position within a stack of modular pumps, a band is passed around the ends of the shaft 42 and a flange on back plate 47 to prevent the shaft from becoming off-center within the pump housing 31.

Figure 3:
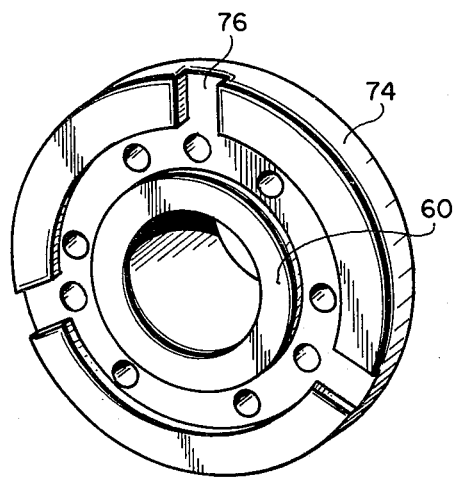
FIG. 3 is a view taken through 3—3 of FIG. 2 illustrating a portion of the self-centering coupling units.
Figure 4:
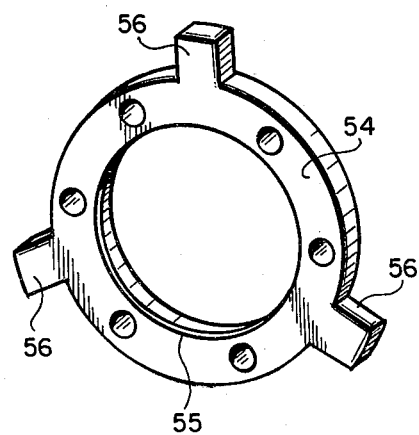
FIG. 4 is a view taken through 4—4 of FIG. 2 illustrating the self-centering key element which makes up part of the self-centering coupling.

Referring now to FIGS. 2, 3, and 4. The self-centering axial adjustment coupling generally designated as 50 is comprised of a coupling flange 52 which is integral with shaft 42 of modular pump 30. The flange forms a conical surface 53 at end 70 of shaft 42, while the opposite end 72 of shaft 42 consists of a separate flange 74 which interfits with end 70 of an adjacent pump. Flanges 74 consist of three slots positioned 120 degrees apart to accept a key member 54 which has three drive keys 56 which interfit with the slots 76 of flange 74. The key 54 has formed therein a conical surface designed to conform to the conical surface 53 on end 70. As the key is positioned adjacent the conical surface 53 of end 70, the key self-centers on that conical surface of the shaft when flanges 70 and 74 are mated together, coupling a pair of modular pump units 30 together through the multiplicity of bolts 58 through the two flanges. As the bolts are coming together, the keyway positioned within slots 76 of flange 74 begins to center itself on the paralleling conical surfaces 55 and 53, thus centering the two flanges 70 and 74 thereby aligning the shafts 42 of the two coupled pump units. Centering screws 57, then, are tightened against the back of the extended pins 56 forcing the key tighter on to the conical surface of the mated shafts 42, thereby accurately aligning the two shafts. The shafts are now in driving relationships via the three drive keys 56 engaged within slots 76 of flange 74, thereby securely aligning and attaching the shafts 42 within adjacent modular pump units 30. The flange attach bolts are subsequently tightened, finishing the coupling operation. The only remaining task is to shim the base 32 of housing 31 to take up any slack that might result from the self-centering coupling operation. A series of shims 41, for example, may be employed to support base 32 after the coupling operation takes place. The bands 49 supporting the bearingless shaft 42 during its inoperative shipping stage or storing stage, are then removed after the ends of the shaft are aligned with the adjacent modular pump units. The shaft of one pump is supported by the shaft of an adjacent modular pump unit. The string of pumps are supported by separate bearing units at opposite ends.

By utilizing the self-centering coupling device heretofore described, a defective pump unit may easily be replaced by removing the series of coupling bolts 58 from adjacent ends of the defective modular unit, and removing the pump from the base of the pumping station and replacing it with an operative pump. The self-centering coupling mechanism generally designated as 50 then easily realigns the new pump with the series of pumps for subsequent operation.

Any module of the multiple pump stackup may be removed for overhaul or other service without being replaced with a standby pump. A dummy driveshaft having the same end couplings may be connected in line in place of the pump module (not shown).

An example of a high pressure, high temperature centrifugal slurry pump as heretofore described consists of a 500 horsepower 3000 PSI capability that will pump a coal slurry at a temperature of about 500° F. The pump impeller 38 (FIG. 2) is about 12 inches in diameter with a tip speed of approximately 180 feet per second. The average blade discharge angle is approximately 40 degrees. The inlet and outlet volutes 34 and 36 are designed to reduce wear by slowing down the velocity of the slurry through the pump 30. Twelve of the foregoing pumps driven by a 6000 horsepower motor turning at approximately 3550 RPM will pump about 2500 gallons per minute. Each pump in series raises the slurry pressure 250 PSI.

It will, of course, be realized that various modifications can be made in the design and operation of the present invention without departing from the spirit thereof. Thus, while the principal, preferred construction, and mode of operation of the invention have been explained, and what is now considered to represent its best embodiment has been illustrated and described, it should be understood that within the scope of the appended claims the invention may be practiced otherwise than as specifically illustrated and described.

I claim:

1. In a multiple pump assembly wherein single pump units are connected in series to a drive means, the improvement which comprises:
   a modular pump housing forming inlet and outlet means therein, said pump having a first mating coupling flange on an impeller shaft and a second mating coupling flange on a second end on said shaft,
   conduit means connecting the outlet from one modular pump to the inlet of an adjacent pump,
   an axially adjustable, forced center drive coupling connectable to said first and second ends of said impeller shaft, said drive coupling having a circular disc forming an inner concentric opening with a conical surface therein, said disc further forming at least three drive keys equidistantly spaced and extending radially from said disc, said keys interfit with slots formed in an opposing coupling flange of an adjacent pump, said coupling flange having a short impeller shaft extension with a conical surface formed at its end to conform to said conical surface in said disc, said disc as it is moved by mechanical means from one mating flange into an opposing flange, the adjacent pump shafts are forced concentric one with the other, thus aligning one modular pump with an adjacent pump.

2. The invention as set forth in claim 1 further comprising bearing assemblies positioned at adjacent ends of said multiple pump assembly.

3. The invention as set forth in claim 2 wherein said modular pump housing has no bearings, said bearing assemblies at adjacent ends of the line of pumps in series serve to provide the bearings for all of the pumps in series, said pumps being aligned by said axially adjustable, forced center drive coupling.

4. The invention as set forth in claim 1 wherein said modular pump is a centrifugal pump.

5. The invention as set forth in claim 4 wherein said centrifugal pump is a coal slurry pump.

6. The invention as set forth in claim 5 wherein said modular pump housing forms a large plenum space around an impeller supported by said impeller shaft, said large plenum serves to reduce the relative velocity of said coal slurry between the impeller and the volute walls formed by said pump housing to reduce the abrasive quality of said coal slurry.

7. The invention as set forth in claim 6 wherein said walls of said plenum chamber formed by said pump housing are hardened by hardening means.

8. The invention as set forth in claim 7 wherein said hardening means is a boride deposit.

9. The invention as set forth in claim 8 wherein said hardening means is a tungsten carbide deposit.

10. The invention as set forth in claim 9 wherein said hardening means is a hard metal insert.

11. The invention as set forth in claim 1 wherein said mechanical means to move said disc into alignment with said mating flange is a set screw for each of said at least three drive keys in said opposing flange, said set screws as they are advanced toward said radially extending drive keys align said adjacent pump shafts one with the other.

* * * * *